United States Patent
Malik et al.

(10) Patent No.: US 8,881,240 B1
(45) Date of Patent: *Nov. 4, 2014

(54) METHOD AND APPARATUS FOR AUTOMATICALLY ADMINISTRATING ACCESS RIGHTS FOR CONFIDENTIAL INFORMATION

(75) Inventors: Gitesh Malik, New Delhi (IN); Jonathan Herbach, Mountain View, CA (US); Chetan Mehrotra, Indiraphuram Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/961,005

(22) Filed: Dec. 6, 2010

(51) Int. Cl.
*G06F 7/04* (2006.01)
*G06F 21/60* (2013.01)
*G06F 21/41* (2013.01)

(52) U.S. Cl.
CPC .............. *G06F 21/604* (2013.01); *G06F 21/41* (2013.01)
USPC ........................................................... 726/4

(58) Field of Classification Search
CPC ..... G06F 21/604; G06F 21/335; G06F 21/41; G06F 21/62; H04L 63/10
USPC .......................................................... 726/4
See application file for complete search history.

(56) References Cited

U.S. PATENT DOCUMENTS

| | | | |
|---|---|---|---|
| 5,999,978 A * | 12/1999 | Angal et al. .................. | 709/229 |
| 7,376,709 B1 * | 5/2008 | Brei et al. ..................... | 709/218 |
| 7,500,262 B1 * | 3/2009 | Sanin et al. ................... | 726/2 |
| 7,647,625 B2 * | 1/2010 | Grinstein ....................... | 726/4 |
| 8,150,820 B1 | 4/2012 | Herbach et al. | |
| 8,271,649 B2 | 9/2012 | Kalofonos et al. | |
| 2004/0172370 A1 * | 9/2004 | Bidan et al. ................... | 705/75 |
| 2006/0117010 A1 * | 6/2006 | Hakala ........................... | 707/9 |
| 2006/0242065 A1 * | 10/2006 | Jogand-Coulomb et al. ... | 705/50 |
| 2008/0072290 A1 * | 3/2008 | Metzer et al. ................. | 726/3 |
| 2012/0060207 A1 * | 3/2012 | Mardikar et al. ............. | 726/4 |
| 2012/0060210 A1 * | 3/2012 | Baker et al. ................... | 726/9 |

OTHER PUBLICATIONS

"OpeniD for Dummies + How to Make Your blog URL as Your OpenID", 3 pages, downloaded on Mar. 10, 2011 from http://www.labnol.org/internet/tools/openid-for-dummies-get-personal-openid-url/1892/.
"Feature Spotlights—Simplifying Access Control in Rights Management ES2", Jonathan Herbach, 2 pages downloaded from http://blogs.adobe.com/security/2010/03/feature_spotlights_-_simplifyi.html.
"Enterprise—scale User Provisioning with Hitachi ID Identity Manager", 9 pages, downloaded on Mar. 10, 2011 from http://idsynch.com/docs/enterprise-scale-user-provisioning-with-hiim.html.

* cited by examiner

*Primary Examiner* — Mohammad W Reza
(74) *Attorney, Agent, or Firm* — Moser Taboada

(57) ABSTRACT

A method and apparatus for automatically administrating access rights for confidential information is disclosure. In one embodiment, access rights are established for at least one user group. Each user group is identified by at least one authentication attribute. In response to verification information from a user requesting access to the confidential information that is stored at a, the verification information is compared with the at least one attribute for the each user group to generate a comparison result. Access to the confidential information by a second computerized device is controlled based on the comparison result and the access rights.

14 Claims, 5 Drawing Sheets

METHOD AND APPARATUS FOR AUTOMATICALLY ADMINISTRATING ACCESS RIGHTS FOR CONFIDENTIAL INFORMATION

BACKGROUND

1. Technical Field

Embodiments of the present application generally relate to data loss prevention systems and, more particularly, to a method and apparatus for automatically administrating access rights for confidential information.

2. Description of the Related Art

Members of an organization (e.g., a small or large corporation, a government entity and/or the like) create and use confidential information (e.g., proprietary data, intellectual property, medical records, financial statements, customer information and/or the like). For example, an employee of an investment company views personal bank statements of various people in order to complete necessary business-related tasks. As another example, patients entrust a doctor with records of their medical histories. It is essential that this doctor protect this confidential information from unauthorized disclosure by employing a data loss prevention system.

Conventional data loss prevention systems use various authentication techniques to verify users that request access on internal and remote computerized devices. If a user is using an internal computerized device, it would be very simple for an administrator to verify the user and provision access rights for certain confidential information. Often, the administrator and the user are located in the same building and can perform the authentication in person. For example, the administrator can hand deliver a username and password of which the user can use to open documents containing the confidential information.

Authenticating users on the remote computerized devices, on the other hand, is difficult and overwhelmingly time consuming for the administrators. Transmitting documents to the remote computerized devices exposes the confidential information to undesired disclosure. In order to reduce security risks and prevent data loss, the administrators exercise great care when provisioning accounts for users on remote computerized devices and creating access rights associated with viewing the documents. For example, the administrator may secure the document with a password-protection feature. Before an authorized user can open the document, the administrator must personally email or communicate the password.

Therefore, there is a need in the art for a method and apparatus for automatically administrating access rights for confidential information that is both convenient for the users and administrators and at the same time ensuring high level of security.

SUMMARY

Various embodiments of the present disclosure generally include a method and apparatus for automatically administrating access rights for confidential information. In one embodiment, access rights for at least one user group are established. Each user group is identified by at least one authentication attribute. In response to verification information from a user requesting access to the confidential information, the verification information is compared with the at least one attribute for the each user group to generate a comparison result. Based on the comparison result and the access rights, access to the confidential information is controlled.

Figure 1:
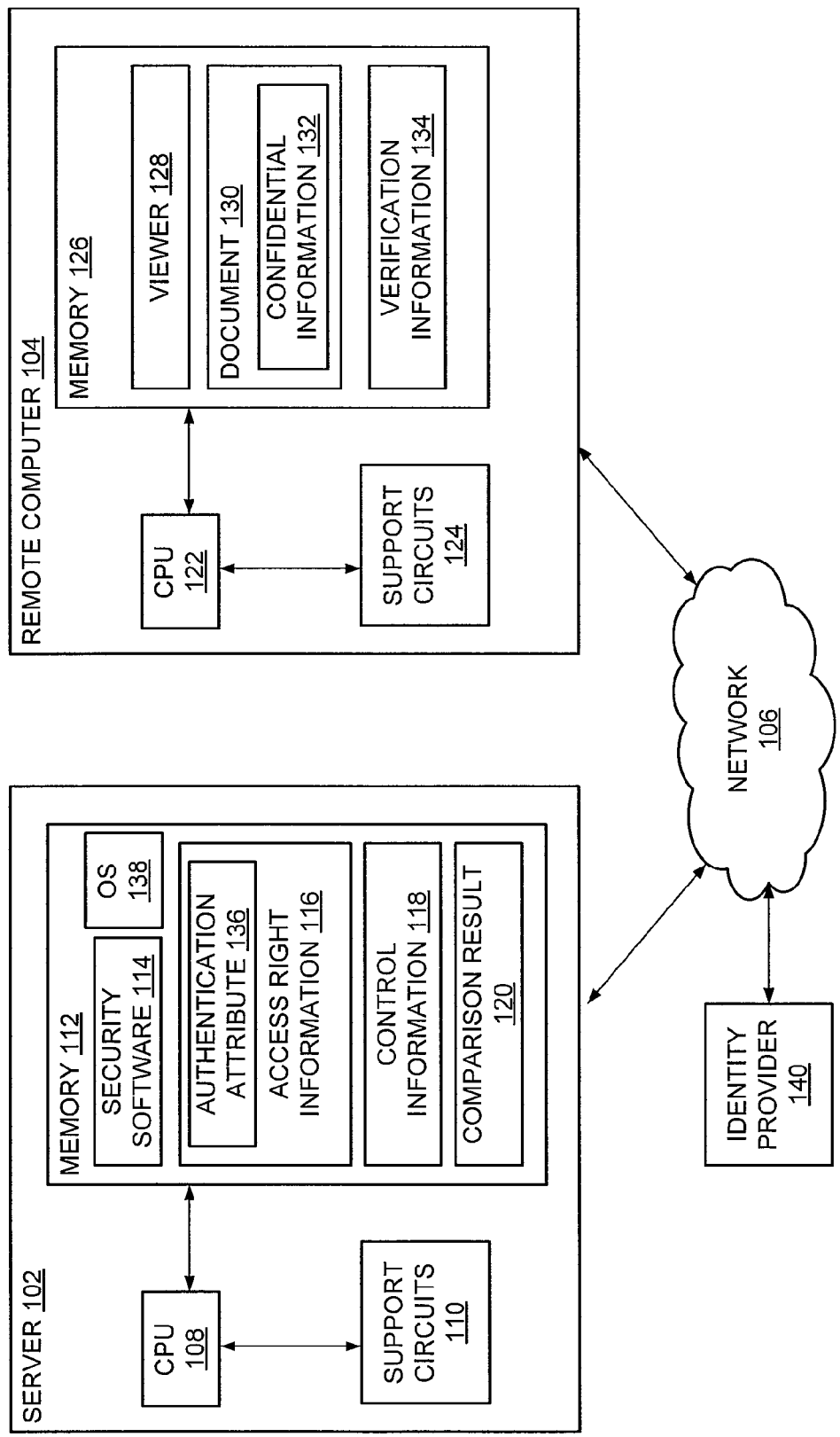
FIG. 1 is a block diagram of a system for automatically administrating access rights for confidential information according to various embodiments.

While the method and apparatus for automatically administrating access rights for confidential information is described herein by way of example for several embodiments and illustrative drawings, those skilled in the art will recognize that the method and apparatus for automatically administrating access rights for confidential information is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for automatically administrating access rights for confidential information are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computerized device once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a selfconsistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computerized device or a similar special purpose electronic computing device. In the context of this specification, therefore, a special purpose computerized device or a similar special purpose electronic computing device is capable of manipulating or transforming signals, typically represented as physical electronic or magnetic quantities within memories, registers, or other information storage devices, transmission devices, or display devices of the special purpose computerized device or similar special purpose electronic computing device.

FIG. 1 is a block diagram of a system 100 for automatically administrating access rights for confidential information according to various embodiments. The system 100 includes a server 102 and a remote computerized device 104 where each is coupled to each other through a network 106. The system 100 further includes an identity provider 140.

Figure 5:
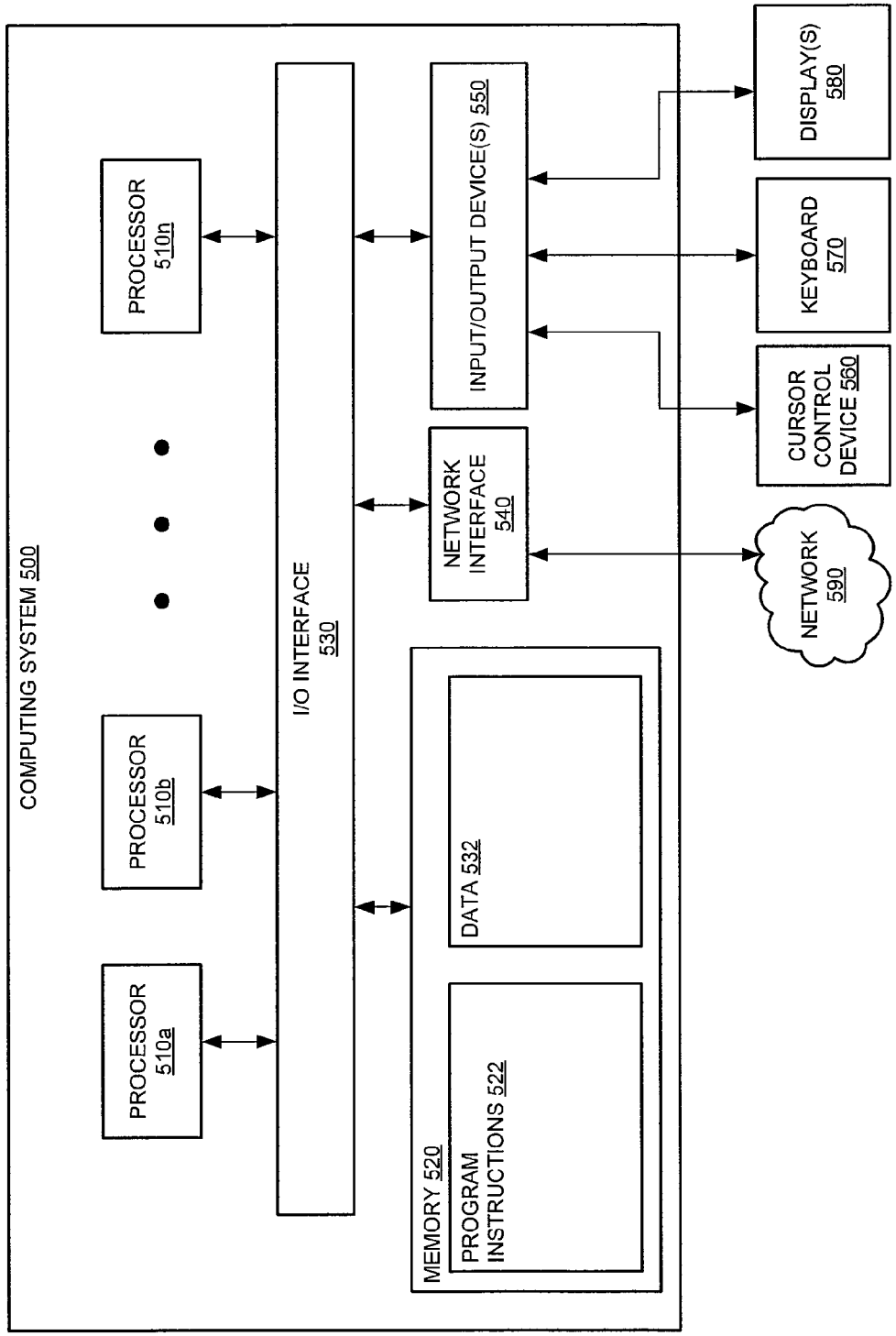
FIG. 5 is a schematic diagram of a computing system that can be used as a computerized device for automatically administrating access rights for confidential information according to one or more embodiments.

The server 102 is a type of computerized device (e.g., a laptop, a desktop, a Personal Digital Assistant (PDA), a tablet, a smart phone (e.g., APPLE® iPhone), other data processing and display systems or devices and/or the like) known to one of ordinary skill in the art having the benefit of this disclosure. Details of a computerized device that can function as the server 102 is described with respect to FIG. 5. The server 102 comprises a Central Processing Unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a read only memory, random access memory, disk drive storage, optical storage, removable storage, and the like. The memory 112 includes various software packages, such as an operating system 138 and security module 114, as well as various data, such as access right information 116, control information 118 and comparison result 120.

The operating system 138 generally manages various computerized device resources (e.g., network resources, data storage resources, file system resources and/or the like). The operating system 138 is configured to execute operations on one or more hardware and/or software devices, such as Network Interface Cards (NICs), hard disks, virtualization layers, firewalls and/or the like. For example, the various software packages call commands associated with the operating system 138 (i.e., native operating system commands) to perform various file system and/or storage operations, such as creating files or metadata, writing data to the files, reading data from the files, modifying metadata associated with the files and/or the like. The operating system 138 may call one or more functions associated with device drivers to execute various file system and/or storage operations.

The remote computerized device 104 is a type of computerized device (e.g., a laptop, a desktop, a Personal Digital Assistant (PDA), a tablet, a smart phone (e.g., APPLE® iPhone), other data processing and display systems or devices and/or the like) known to one of ordinary skill in the art having the benefit of this disclosure. The remote computerized device 104 comprises a Central Processing Unit (CPU) 122, various support circuits 124 and a memory 126. The CPU 122 may comprise one or more commercially available microprocessors or microcontrollers that facilitate data processing and storage. Various support circuits 124 facilitate operation of the CPU 122 and may include clock circuits, buses, power supplies, input/output circuits and/or the like. The memory 126 includes a read only memory, random access memory, disk drive storage, optical storage, removable storage, and the like. The memory 126 includes various software packages, such as a viewer module 128, as well as various data, such as a document 130 comprising confidential information 132 and verification information 134. In some embodiments, the document 130 is a Portable Document Format (PDF) file. PDF is an open standard for document exchange created by Adobe Systems of San Jose, Calif. Therefore, the confidential information 132 may include financial statements, medical records, intellectual property and/or the like that are stored in a document file format type (e.g., ADOBE® PDF, XPDF, MICROSOFT® XML Paper Specification (XPS), Word Document (DOC), PowerPoint Presentation (PPT) and/or the like).

The network 106 comprises a communication system that connects computing devices by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

In some embodiments, the access right information 116 constitutes a policy for controlling access to the confidential information 132 for various user groups. The access right information 116 may indicate a time period (e.g., an event, a fixed date and/or time, a number of units of time (e.g., hours, days, months, years and the like)) when the confidential information 132 is no longer confidential or, alternatively, no longer viewable by a member of a user group.

In some embodiments, the viewer module 128 (e.g., ADOBE® Reader/Acrobat) includes processor executable instructions for automatically controlling access to the confidential information 132. Although one embodiment of the viewer module 128 may be implemented in software, other embodiments may be implemented in hardware or as firmware. In response to the control information 118 from the security module 114, the viewer module 128 restricts access to the document 130 that includes the confidential information 132 to only members of a user group having appropriate access rights. As described in detail further below, the viewer module 128 is utilized by the security module 114 to automatically authenticate the user as a member of such a user group, provision the member with access rights and/or open the document 130 to display the confidential information 132.

In some embodiments, the security module 114 includes processor executable instructions for automatically administrating access rights for the confidential information 132. Although one embodiment of the security module 114 may be implemented in software, other embodiments may be implemented in hardware or as firmware. The security module 114 creates the access rights for one or more user groups where each includes one or more members. For example, the security module 114 may establish rights to view, change and/or print the document 130 for users having a particular email domain name. Hence, an unprovisioned user may use an email address with a same domain name to automatically access the document 130 at the remote computerized device 104 via the viewer module 128. Then, the security module 114 stores the access rights in the access right information 116 along with the particular domain name as one of the authentication attributes 136 for identifying each user group. As another example, the security module 114 may establish access rights for users having a particular Internet Protocol (IP) Address or a portion thereof (i.e., a subnet).

The one or more members may refer to users of remote computerized devices, such as the remote computerized device 104, or the remote computerized device being used to attempt to view the confidential information 132 within the document 130. Some of these members are not provisioned with the access rights until an attempt to view the confidential information 132. According to various embodiments, the security module 114 automatically provisions these members as legitimate users and grants access to the confidential information as further explained in detail below.

When an unprovisioned user attempts to view the confidential information 132 by opening the document 130, in response the security module 114 determines whether the verification information 134 matches each and every authentication attribute 136 for a particular user group. Subsequently, the security module 114 communicates the control information 118 instructing the viewer module 128 to either grant or deny access for the unprovisioned user and to restrict the confidential information 132 to members of the particular user group. If the unprovisioned user is not a member, the viewer module 128 is instructed to deny access to the document. Hence, even though the server 102 or an authorized member at another remote computerized device may distribute the document 130 to an unauthorized user, the security module 114 and the viewer module 128 cooperate to prevent the unauthorized user from opening and viewing the document 130.

If, however, the unprovisioned user is identified as a member of the particular user group, the viewer module 128 grants access to the document 130. In addition, the security module 114 creates an account for the unprovisioned user at the server 102 in order to handle future access requests from the same user. When the now provisioned user tries to open the document 130 or another document at another time, the security module 114 recalls the user account and automatically instructs the viewer module 128 to grants access.

Before a user may be provisioned with such access rights, the security module 114 must perform an authentication technique. In some embodiments, the security module 114 instructs the viewer module 128 to prompt the user for the verification information 134. For example, the user may input an email address that includes a domain name in addition to name, title, company name, work address and work phone number. The user may also be required to enter sensitive data, such as a home address or a personal phone number. Each is an authentication attribute 136 that may be used to identify a user group of which the user is a member.

Before comparing the verification information 134 with some of these authentication attributes 136, the security module 114 authenticates the user based on the verification information 134. In some embodiments, the security module 114 sends an authentication email to the user at the email address and waits for an acknowledgment. When such an acknowledgement arrives, the security module 114 ensures that the verification information 134 is actually from the user associated with the email address. In some embodiments, the security module 114 independently validates the verification information 134 by authenticating an Internet Protocol (IP) address associated with the remote computerized device 104. Alternatively, the security module 114 performs a reverse-lookup of the email address and validates the data provided. As another example, the security software 114 prompts the user for various information (e.g., full name, organization name, work/home/mobile phone numbers, home/office addresses, an image of the company trademark (i.e., logo), cost center number, date of hire, office computer login username and/or the like). As yet another example, the user may communicate encryption information (e.g., an alphanumeric key) or biometric data (e.g., an image having a thumb print).

Optionally, the security module 114 is communicably coupled to the identity provider 140, which independently validates the verification information 134. Before communicating the verification information 134 to the server 102, the user may select a specific identity provider to perform the independent validation. The viewer module 128 may access metadata associated with the document 130 and stores such metadata (e.g., author information, such as name, title, location, social security number and/or the like) in the verification information 134. Each identity provider 140 is an independent web-based service that processes the verification information 134 including the metadata and returns information indicating whether the user is the actual owner of the email address. As another example, the viewer module 128 may communicate an authentication credential that is stored within an electronic, digitally signed card.

After comparing the verification information 134 with the authentication attributes 136, the security module 114 generates a comparison result 120 based upon which the security module 114 controls access to the confidential information 132. The comparison result 120 includes data indicating whether an authentication attribute within the verification information 134 matches an authentication attribute 136 within the access right information. If the verification information 134 matches each and every authentication attribute for a particular user group, the security module 114 communicates the control information 118 instructing the viewer module 128 to grant access. In response to subsequent access requests from the user, the security module 114 automatically grants access without repeating the authentication technique. In some embodiments, the security module 114 creates account information for the user. On the other hand, if the verification information 134 does not match all of the authentication attributes for the particular user group, the security module 114 communicates the control information 118 instructing the viewer module 128 to deny the user access to the confidential information 132 within the document 130.

In some embodiments, the security module 114 instructs the viewer module 128 to restrict access in accordance with the access rights that are established for the confidential information 132. If a user (e.g., an out of band user) on the remote computerized device 102 attempts to view the confidential information 132 when not permitted, the control information 118 instructs the viewer module 128 to prevent access. For example, the control information 118 may permit the confidential information 130 to be viewed at any time but the document 130 may only be printed once. Whenever the user attempts to open the document 128, the viewer module 128 grants access to view. However, the viewer module 128 denies access if the user attempts to print more than one copy.

It is appreciated that the access rights for the document 130 may be extended to other documents. In some embodiments, the security module 114 instructs the viewer module 128 to grant access to additional documents that may be communicated to the user at the remote computerized device 108 at a later date. For example, if the document 130 is a first in a series of documents, the user is also granted access to view the remaining documents in the series. Some of the remaining documents may be provided by a same company or a same person for a specific task. As another example, the additional documents may be unrelated to the document 130 but still require authentication from the server 102. After granting the user with access to the document 130, the security module 114 instructs the viewer module to also grant access to the additional documents without repeating the same authentication operations.

Figure 2:
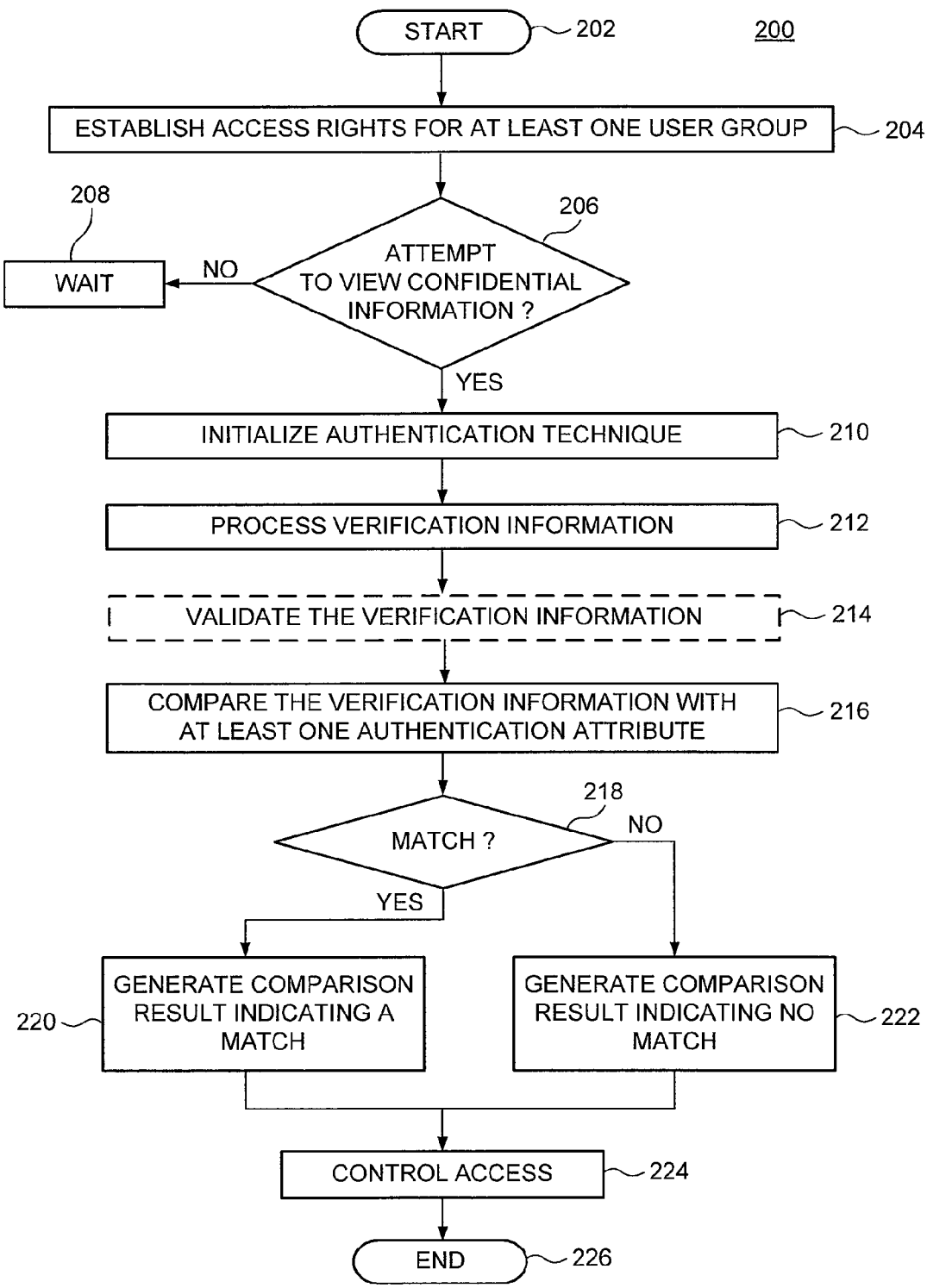
FIG. 2 is a flow diagram of a method for automatically administrating access rights for confidential information according to various embodiments.

FIG. 2 is a flow diagram of a method 200 for automatically administrating access rights for confidential information according to various embodiments. In some embodiments, security module (e.g., the security module 114 of FIG. 1) performs the steps of the method 200. The method 200 starts at step 202 and proceeds to step 204. At step 202, the method 200 establishes access rights for at least one user group. Each user group is identified through one or more authentication attributes. Each authentication attribute corresponds with a shared characteristic of each and every member of a particular user group, such as an email domain.

At step 206, the method 200 determines whether a user attempted to view confidential information. In some embodiments, the confidential information is a stored within a document (e.g., a computerized device file) and the user attempted to open the document via a viewer module (e.g., the viewer module 128 of FIG. 1). In turn, the viewer module requests instructions from a server (e.g., the server 102 of FIG. 1) that is configured to automatically administrate access rights for the confidential information (e.g., the confidential information 132 of FIG. 1) to users on remote computerized devices (e.g., the remote computerized device 104 of FIG. 1). If the method 200 determines that an attempt to view the confidential has not occurred, the method 200 proceeds to step 208 and waits. In some embodiments, the method 200 waits for a message from the viewer module requesting instructions for authenticating and provisioning the user. When such a message is detected, the method 200 proceeds to step 210.

At step 210, the method 200 initializes an authentication technique during which verification information is aggregated. In some embodiments, the method 200 requests various information from the user, such as an email address, name and company name. Such information may be utilized as attributes for authenticating the user and identifying a user group of which the user is a member. For example, security module instructs the viewer module to prompt the user for authentication attributes, which are communicated to the server. The viewer module may also be configured automatically identify and communicate the authentication attributes without user assistance.

At step 212, the method 200 processes the verification information. At optional step 214, the method 200 validates the verification information. In some optional embodiments, the method 200 uses an identity provider to independently validate the verification information. The identity provider may correspond with metadata associated with the document. As an example, the user may be a University professor that communicates the document to another professor and uses the server as an access rights management server. As such, the access right information is a policy that protects the document from unauthorized disclosure. Upon opening the document, the viewer module presents the other professor with an authentication dialog box through which the other professor registers with the server as a legitimate member of a user group having appropriate access rights. Before such registration, the security module examines metadata associated with the document and determines that the intended recipient is from an education institute. Accordingly, the security module presents the other professor with the option of utilizing a university authentication service to validate the verification information and obtain access to the document. When the university authentication server communicates information verifying the identity of the other professor, the security module proceeds to compare the verification information with the authentication attributes for the user groups.

At step 216, the method 200 compares the verification information with at least one authentication attribute for identifying at least one user group. At step 218, the method 200 determines whether the verification information matches at least one authentication attribute. After receiving the verification information from the remote computerized device, the method 200 compares each authentication attribute within the verification information with a corresponding authentication attribute (e.g., the authentication attributes 136 of FIG. 1) from access right information (e.g., the access right information 116 of FIG. 1). For example, if the security module defines a particular user group by an email domain name, then each authorized member shares the same email domain name. The security module subsequently compares an email domain name associated with the user is compared with the email domain name for the particular user group.

If the method 200 determines that the verification information matches the at least one authentication attribute, the method 200 proceeds to step 220. At step 220, the method 200 generates a comparison result indicating a match. If, on the other hand, the method 200 determines that the verification information and the at least one authentication attribute do not match, the method 200 proceeds to step 222. At step 222, the method 200 generates a comparison result indicating that the verification information and the at least one authentication attribute do not match.

At step 224, the method 200 controls access to the confidential information based on the comparison result. In some embodiments, the method 200 communicates control information (e.g., the control information 118 of FIG. 1) to restrict access to the authorized members of the particular user group. For example, the security module may instruct the viewer module to deny access to any user that does not share the email domain name with the particular user group. At step 226, the method 200 ends.

Figure 3:
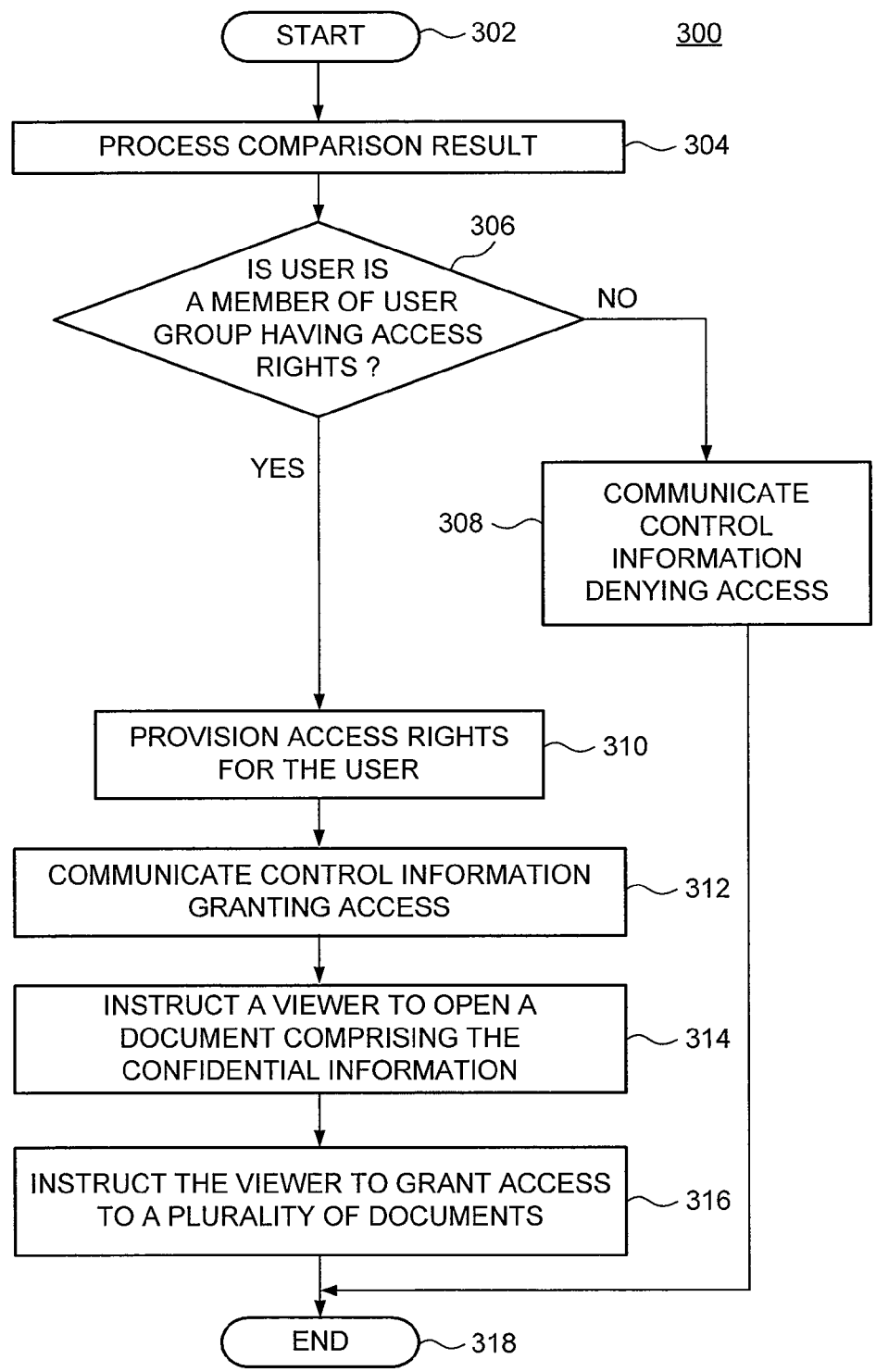
FIG. 3 is a flow diagram of a method for restricting access to confidential information to members of a user group having access rights according to various embodiments.

FIG. 3 is a flow diagram of a method 300 for restricting access to confidential information to members of a user group having access rights according to various embodiments. In some embodiments, the method 300 represents one implementation of step 222 of the method 200 during which security module (e.g., the security module 114 of FIG. 1) controls access to the confidential information based on a comparison result (e.g., the comparison result 120 of FIG. 1) and access right information (e.g., the access right information 116 of FIG. 1) as described further below.

The method 300 starts at step 302 and proceeds to step 304. At step 304, the method 300 processes the comparison result, which indicates whether there is a matching authentication attribute within verification information for each and every authentication attribute for identifying a user group. Access rights for confidential information are established for the identified user group. The verification information pertains to a user at a remote computerized device and may include job-related data, such as a company email address or email domain name, according to some embodiments.

At step 306, the method 300 determines whether a user is a member of a user group having access rights for confidential information. If the method 300 determines that the user is not a member, the method 300 proceeds to step 308. At step 308, the method 300 communicates control information denying access. If, on the other hand, the method 300 determines that the user is a member, the method 300 proceeds to step 310. At step 310, the method 300 provisions access rights for the user. At step 312, the method 300 communicates control information granting access. At step 314, the method 300 instructs a viewer module to open a document comprising the confidential information. At step 316, the method 300 instructs the viewer module to grant access to a plurality of documents to which the user group associated with the user has access rights to open, print and/or modify. At step 318, the method 300 ends.

Figure 4:
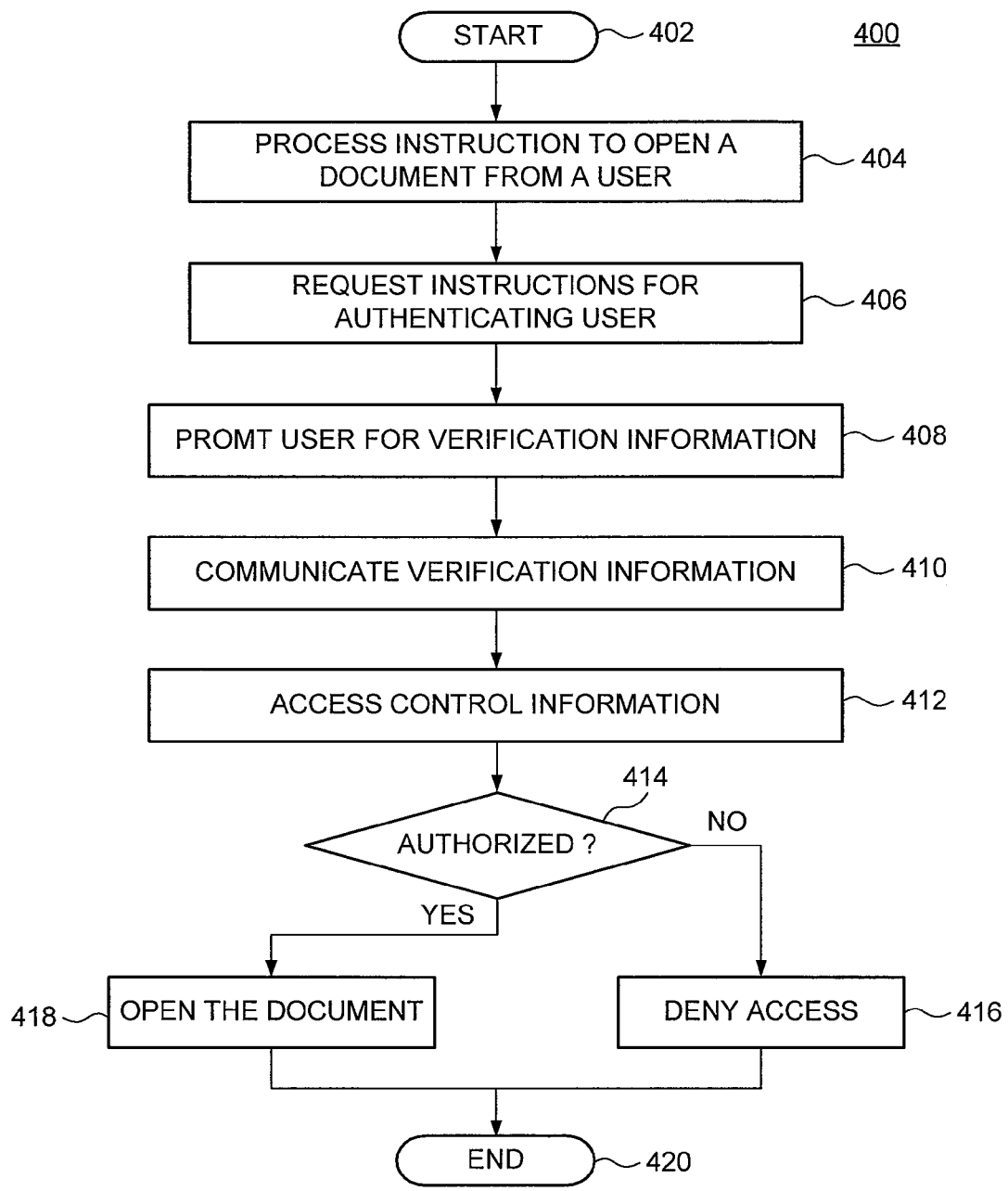
FIG. 4 is a flow diagram of a method for automatically controlling access to confidential information at a remote computerized device according to various embodiments.

FIG. 4 is a flow diagram of a method 400 for automatically controlling access to confidential information at a remote computerized device according to various embodiments. In one embodiment, steps of the method 400 are performed by a viewer module (e.g., the viewer module 128 of FIG. 1).

The method 400 starts at step 402 and proceeds to step 404. At step 404, the method 400 processes instructions to open a document from a user. At step 406, the method 400 requests instructions for authenticating the user. These instructions should also indicate whether to grant or deny access to the confidential information. At step 408, the method 400 prompts the user for at least one authentication attribute. At step 410, the method 400 communicates verification information.

At step 412, the method 400 accesses control information. Based on the control information, the method 400 restricts access to the document to members of an authorized user group. At step 414, the method 400 determines whether the user is a member of an authorized user group. If the method 400 determines that the user is an authorized member, the method 400 proceeds to step 416. At step 416, the method 400 grants access to the document. In some embodiments, the method 400 opens the document and displays the confidential information. If, on the other hand, the method 400 determines that the user is not authorized to access the confidential information within the document, the method 400 proceeds to step 418. At step 418, the method 400 denies access to the document. At step 420, the method 400 ends.

Example Computerized device System

Various embodiments of a method and apparatus for automatically administrating access rights, as described herein, may be executed on one or more computerized device systems, which may interact with various other devices. One such computerized device system is computerized device system 500 illustrated by FIG. 5, which may in various embodiments implement any of the elements or functionality illustrated in FIGS. 1-4. In various embodiments, computerized device system 500 may be configured to implement the server 102 or the remote computerized device 104 described above. While the illustrated system demonstrates computerized device system 500 implementing the software 114 or the viewer module 128, computerized device system 500 may be used to implement any other system, device, element, functionality or method of the above-described embodiments. In the illustrated embodiments, computerized device system 500 may be configured to implement the security module 114 and/or the viewer module 128 as processor-executable executable program instructions 522 (e.g., program instructions executable by processor(s) 510 a-n) in various embodiments.

In the illustrated embodiment, computerized device system 500 includes one or more processors 510 coupled to a system memory 520 via an input/output (I/O) interface 530. Computerized device system 500 further includes a network interface 540 coupled to I/O interface 530, and one or more input/output devices 550, such as cursor control device 560, keyboard 570, and display(s) 580. In various embodiments, any of components 560 or 570 may be utilized by the security module 114 and/or the viewer module 128 to receive the verification information 134 as described above. In various embodiments, a user interface may be generated and displayed on display 580. In some cases, it is contemplated that embodiments may be implemented using a single instance of computerized device system 500, while in other embodiments multiple such systems, or multiple nodes making up computerized device system 500, may be configured to host different portions or instances of various embodiments. For example, in one embodiment some elements may be implemented via one or more nodes of computerized device system 500 that are distinct from those nodes implementing other elements. In another example, multiple nodes may implement computerized device system 500 in a distributed manner.

In different embodiments, computerized device system 500 may be any of various types of devices, including, but not limited to, a personal computerized device system, desktop computerized device, laptop, notebook, or netbook computerized device, mainframe computerized device system, handheld computerized device, workstation, network computerized device, a camera, a set top box, a mobile device, a consumer device, video game console, handheld video game device, application server, storage device, a peripheral device such as a switch, modem, router, or in general any type of computing or electronic device.

In various embodiments, computerized device system 500 may be a uniprocessor system including one processor 510, or a multiprocessor system including several processors 540 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computerized device-accessible media or on similar media separate from system memory 520 or computerized device system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computerized device system 500 and other devices attached to a network (e.g., network 106), such as one or more external systems or between nodes of computerized device system 500. In various embodiments, network 540 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computerized device systems 500. Multiple input/output devices 550 may be present in computerized device system 500 or may be distributed on various nodes of computerized device system 500. In some embodiments, similar input/output devices may be separate from computerized device system 500 and may interact with one or more nodes of computerized device system 500 through a wired or wireless connection, such as over network interface 540.

In some embodiments, the illustrated computerized device system may implement any of the methods described above, such as the methods illustrated by the flowcharts of FIGS. 2-4. In other embodiments, different elements and data may be included.

Those skilled in the art will appreciate that computerized device system 500 is merely illustrative and is not intended to limit the scope of embodiments. In particular, the computerized device system and devices may include any combination of hardware or software that can perform the indicated functions of various embodiments, including computerized devices, network devices, Internet appliances, PDAs, wireless phones, pagers, etc. Computerized device system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computerized device system via inter-computerized device communication. Some or all of the system components or data structures may also be stored (e.g., as instructions or structured data) on a computerized device-accessible medium or a portable article to be read by an appropriate drive, various examples of which are described above. In some embodiments, instructions stored on a computerized device-accessible medium separate from computerized device system 500 may be transmitted to computerized device system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computerized device-accessible medium or via a communication medium. In general, a computerized device-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:
1. A computer implemented method for administering access to one or more documents in accordance with an access rights policy, comprising:
responsive to an initial attempt, by a user of a remote computerized device, to access a document containing information subject to restrictions on access for a finite time period, determining whether the time period has expired;

if the finite time period has expired, granting access for the user to view the document at the remote computerized device; and if the time period has not yet expired, treating the user initially as an unprovisioned user by prompting the user to enter an email address;

determining whether a domain specified in the entered email address corresponds to a group of users entitled to access the document from a remote computerized device; and if the domain specified does correspond to a group of users entitled to access the document from a remote computerized device, granting access for the user to view the document at the remote computerized device; and thereafter treating the user as a provisioned user by automatically granting the user, without prompting, subsequent access to the document and any other document subject to restrictions on access according to the access rights policy.

2. The method of claim 1, further comprising communicating control information to the remote computerized device instructing a viewer module to at least one of grant or deny access to the document containing information subject to restrictions.

3. The method of claim 2, wherein the control information instructs the viewer module to open the document containing information subject to restrictions.

4. The method of claim 1, wherein treating a user as an unprovisioned user further includes validating verification information provided by the user using metadata from the document containing information subject to restrictions.

5. The method of claim 4 further comprising communicating the verification information and the metadata to an independent identity provider.

6. The method of claim 1, wherein a computer readable medium for storing processor executable instructions that, when executed by a computerized device, causes the computerized device to perform each determining step.

7. The method of claim 1, wherein treating the user as a provisioned user comprises instructing a viewer module to grant access to a plurality of documents to which a user group associated with the user and identified by the provided domain name has access rights.

8. A computer implemented method for automatically controlling access to confidential information at a remote computerized device, comprising:

processing instructions that are invoked by a user to open a document comprising confidential information to which access is automatically controlled according to an access rights policy;

communicating verification information associated with the user, wherein the verification information comprises at least one authentication attribute for identifying a user group having access rights to the document, wherein the at least one authentication attribute includes a particular email domain name shared by all members of the user group and wherein the access rights policy defines a time period, wherein at the end of the time period, the need for controlling access to the document expires;

receiving control information based on authentication of the user;

in response to control information from a server, prior to expiration of the time period, restricting access to the document at the remote computerized device to users possessing the at least one authentication attribute, and extending access rights to a document in a series of documents when access rights have been previously granted for access to a document in the series of documents, without communicating verification information associated with the user; and disabling access rights restrictions to the document after the expiration of the time period.

9. The method of claim 8, wherein restricting access to the document further comprising if the user is a member of the user group having the access rights, opening the document to display the confidential information.

10. The method of claim 8, wherein a computer readable medium for storing processor executable instructions that, when executed by a computing system, causes the computing system to perform the processing step, the communicating step and the restricting step.

11. A computerized system for automatically administrating access rights for confidential information, comprising:

a viewer module for processing instructions that are invoked responsive to an attempt, by a user using a remoter computer, to access a document containing information subject to restrictions on access for a finite time period; and a server comprising a security module for processing instructions, responsive to the attempt, for determining whether the time period has expired;

if the finite time period has expired, for granting access for the user to view the document at the remote computerized device; and if the time period has not yet expired, treating the user initially as an unprovisioned user of a remote computing system by prompting the user to enter an email address;

determining whether a domain specified in the entered email address corresponds to a croup of users entitled to access the document from a remote computerized device; and if the domain specified does correspond to a group of users entitled to access the document from a remote computerized device, granting access for the user to view the document at the remote computerized device; and thereafter treating the user as a provisioned user by automatically granting the user, without prompting, subsequent access to the document and any other document subject to restrictions on access according to the access rights policy.

12. The system of claim 11, wherein the viewer module restricts access to the document containing information subject to restrictions on access to members of the at least one user group in accordance with control information received from the server.

13. The system of claim 11, wherein the security module uses an identity provider to independently validate the verification information using metadata from the document containing information subject to restrictions on access received from the server.

14. The system of claim 11, wherein the security module instructs the viewer module to open a document information subject to access restrictions.

* * * * *